（12） United States Patent
Mortenson

(10) Patent No.: US 9,618,133 B2
(45) Date of Patent: Apr. 11, 2017

(54) PNEUMATIC VALVE WITH EMERGENCY STOP BUTTON

(71) Applicant: Ross Operating Valve Company, Troy, MI (US)

(72) Inventor: Dennis L. Mortenson, Anderson, SC (US)

(73) Assignee: Ross Operating Valve Company, Troy, MI (US)

( * ) Notice: Subject to any disclaimer, the term of this patent is extended or adjusted under 35 U.S.C. 154(b) by 36 days.

(21) Appl. No.: 14/620,280

(22) Filed: Feb. 12, 2015

(65) Prior Publication Data

US 2015/0233492 A1 Aug. 20, 2015

Related U.S. Application Data

(60) Provisional application No. 61/942,884, filed on Feb. 21, 2014, provisional application No. 61/939,799, filed on Feb. 14, 2014.

(51) Int. Cl.
*F16K 35/02* (2006.01)
*F15B 20/00* (2006.01)

(52) U.S. Cl.
CPC ............ *F16K 35/025* (2013.01); *F15B 20/00* (2013.01); *Y10T 137/7731* (2015.04); *Y10T 137/7732* (2015.04)

(58) Field of Classification Search
CPC ...... F15B 20/00; F16K 35/025; F16K 17/168; Y10T 137/7731; Y10T 137/7732
See application file for complete search history.

(56) References Cited

U.S. PATENT DOCUMENTS 3,510,099 A * 5/1970 Crump .................... F01B 17/00
173/169
3,543,794 A * 12/1970 Stewart, Jr. ............. F15B 13/07
137/624.14

(Continued)

FOREIGN PATENT DOCUMENTS

DE          2251634        5/1974
EP          0073886 A1     3/1983
GB          2014701 A      8/1979

OTHER PUBLICATIONS

User's manual, Category 0 emergency stop (option +Q963) for ACS880-07 drives, ABB industrial drives, pp. 1-18.

(Continued)

*Primary Examiner* — Craig Schneider
*Assistant Examiner* — Kevin Barss
(74) *Attorney, Agent, or Firm* — Carlson, Gaskey & Olds, P.C.

(57) ABSTRACT

A handheld device according to an exemplary embodiment of this disclosure, among other possible things, includes an emergency stop valve including an inlet, at least one outlet, an exhaust, a main passage, and a stem passage. Air flows from the inlet to the outlet and from the outlet to the exhaust during normal operation of the handheld device, and the inlet is blocked and the air is exhausted through the exhaust during emergency operation of the handheld device. The handheld device includes a valve stem assembly received in the main passage, and the valve stem assembly includes a button and a cavity having a pocket. The handheld device also includes a locking stem including an end portion, and the locking stem is received in the stem passage and the end portion of the locking stem is received in the cavity of the valve stem assembly. The end portion of the locking stem is located in the cavity during normal operation of the handheld device when the valve stem assembly is in a first (Continued)

position to direct air to the inlet of the pendant valve, and the end portion of the locking stem is located in the pocket of the cavity of the valve stem assembly during emergency operation of the handheld device to retain the valve stem assembly in a second position when the emergency button is activated to direct air to the exhaust.

20 Claims, 6 Drawing Sheets

(56) References Cited

U.S. PATENT DOCUMENTS

| | | | | |
|---|---|---|---|---|
| 4,080,987 | A | * | 3/1978 | Fogg ................... F16K 17/00 137/464 |
| 4,595,036 | A | * | 6/1986 | Johnston ............ F16K 11/0743 137/596 |
| 5,041,705 | A | | 8/1991 | Piccoli |
| 5,615,704 | A | * | 4/1997 | Sell ...................... B66C 13/56 137/596.1 |
| 5,821,488 | A | | 10/1998 | Falcon |
| 5,832,944 | A | * | 11/1998 | Lindner ............... F01D 17/145 137/1 |
| 5,860,446 | A | | 1/1999 | Hunt |
| 6,215,204 | B1 | | 4/2001 | Brown et al. |
| 6,501,040 | B2 | | 12/2002 | Hall et al. |
| 6,686,672 | B2 | | 2/2004 | Brown et al. |
| 7,022,930 | B2 | | 4/2006 | Hall et al. |
| 7,216,668 | B1 | * | 5/2007 | Adams .................... F16K 17/32 137/462 |
| 7,242,116 | B2 | | 7/2007 | Kawazu et al. |
| 7,936,094 | B2 | | 5/2011 | Rossi et al. |

OTHER PUBLICATIONS

E-Stop Control System, Emergency Stop Control System for Inert Service, Chart Inc., 2009.
Nix, Doug; Machinery Safety 101, Emergency Stop—What's so confusing about that?, http://machinerysafety101.com/series/emergency-stop/#axzz2uk1d0khn, Mar. 6, 2009.
Guardmaster® Safety Relay Light Curtain Safety Function, Rockwell Automation, Inc., Publication SAFETY-AT066C-EN-E, May 2013.
International Search Report and Written Opinion for International Application No. PCT/US2015/015530 mailed Jun. 9, 2015.
International Preliminary Report on Patentability for International Application No. PCT/US2015/015530 mailed Feb. 1, 2016.

* cited by examiner

PNEUMATIC VALVE WITH EMERGENCY STOP BUTTON

CROSS REFERENCE TO RELATED APPLICATIONS

This application claims priority to U.S. Provisional Application No. 61/942,884 filed on Feb. 21, 2014 and U.S. Provisional Application No. 61/939,799 filed Feb. 14, 2014.

BACKGROUND OF THE INVENTION

An E-stop button (or emergency stop button) can be pushed to stop operation of a pneumatic device and quickly divert air from an outlet to an exhaust. The Emergency stop isolates upstream energy and dissipates downstream energy of the pneumatic device.

SUMMARY OF THE INVENTION

A handheld device according to an exemplary embodiment of this disclosure, among other possible things, includes an emergency stop valve including an inlet, at least one outlet, an exhaust, a main passage, and a stem passage. Air flows from the inlet to the outlet and from the outlet to the exhaust during normal operation of the handheld device, and the inlet is blocked and the air is exhausted through the exhaust during emergency operation of the handheld device. The handheld device includes a valve stem assembly received in the main passage, and the valve stem assembly includes a button and a cavity having a pocket. The handheld device also includes a locking stem including an end portion, and the locking stem is received in the stem passage and the end portion of the locking stem is received in the cavity of the valve stem assembly. The end portion of the locking stem is located in the cavity during normal operation of the handheld device when the valve stem assembly is in a first position to direct air to the inlet of the pendant valve, and the end portion of the locking stem is located in the pocket of the cavity of the valve stem assembly during emergency operation of the handheld device to retain the valve stem assembly in a second position when the emergency button is activated to direct air to the exhaust.

DETAILED DESCRIPTION OF THE PREFERRED EMBODIMENT

Figure 1:
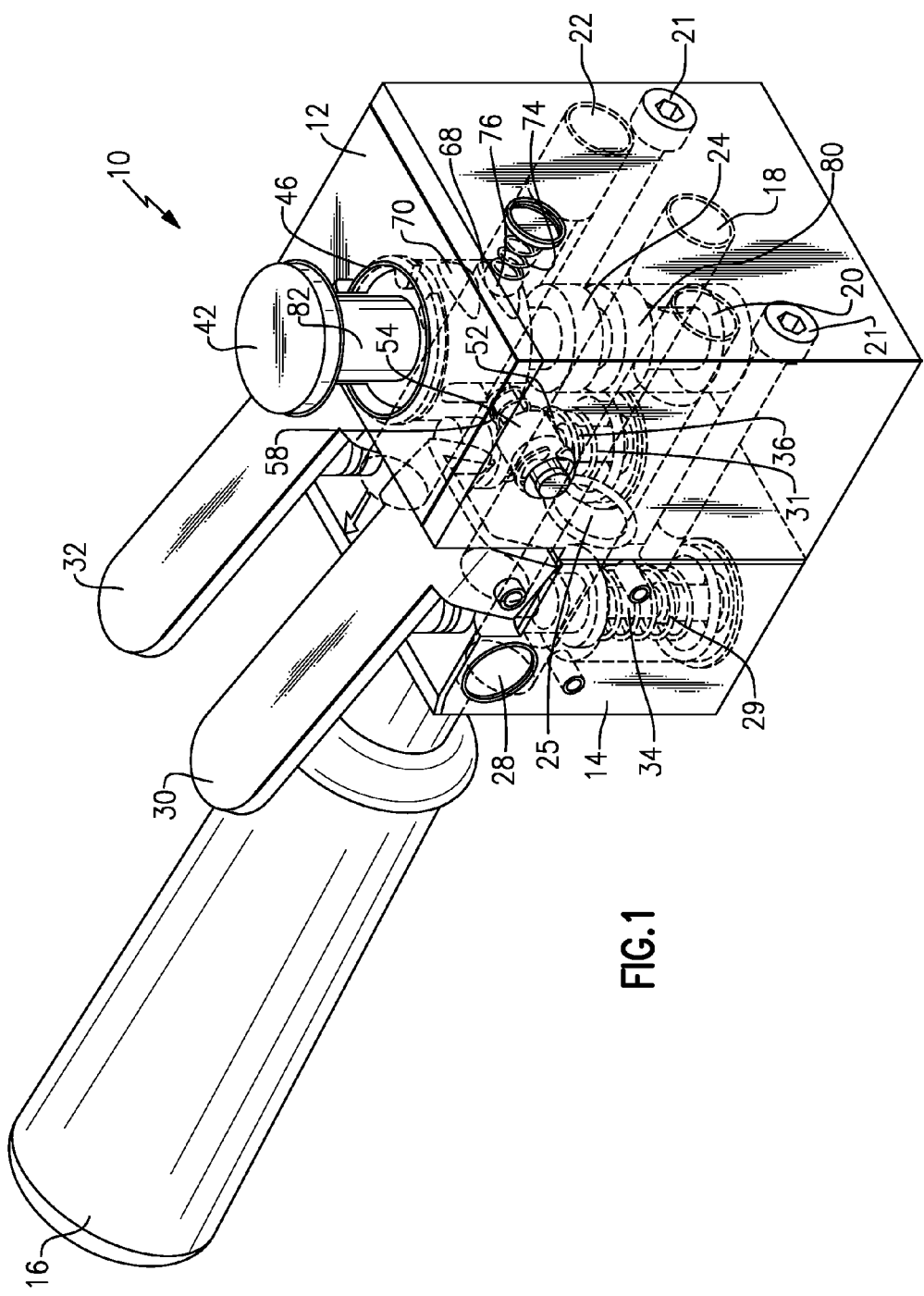
FIG. 1 illustrates a perspective view of a handheld device showing internal components.

FIGS. 1 to 4 illustrate a handheld device 10 including an emergency stop valve 12 and a pendant valve 14. The pendant valve 14 has a handle 16 to be grasped by an operator. In one example, the pendant valve 14 is a 3 way/2 position valve. The emergency stop valve 12 is mounted to the pendant valve 14 by fasteners 21.

The emergency stop valve 12 includes an inlet 18, a first outlet 20, a second outlet 22, an exhaust 33, and a valve stem assembly 24. The pendant valve 14 includes an inlet 23, a first outlet 25, a second outlet 27, and exhausts 28. The first outlet 25 and the second outlet 27 of the pendant valve 14 are aligned with the first outlet 20 and the second outlet 22, respectively, of the emergency stop valve 12. The inlet 23 of the pendant valve 14 is also aligned with the inlet 18 of the emergency stop valve 12. The pendant valve 14 also includes a first valve stem 34 and a second valve stem 36. A first pendant 30 and a second pendant 32 can be pressed or activated to control a position of the first valve stem 34 and the second valve stem 36, respectively, to control the flow of the air through the first outlet 25 and the second outlet 27, respectively, of the pendant valve 14 and therefore through the first outlet 20 and the second outlet 22 of the emergency stop valve 12, respectively.

Figure 2:
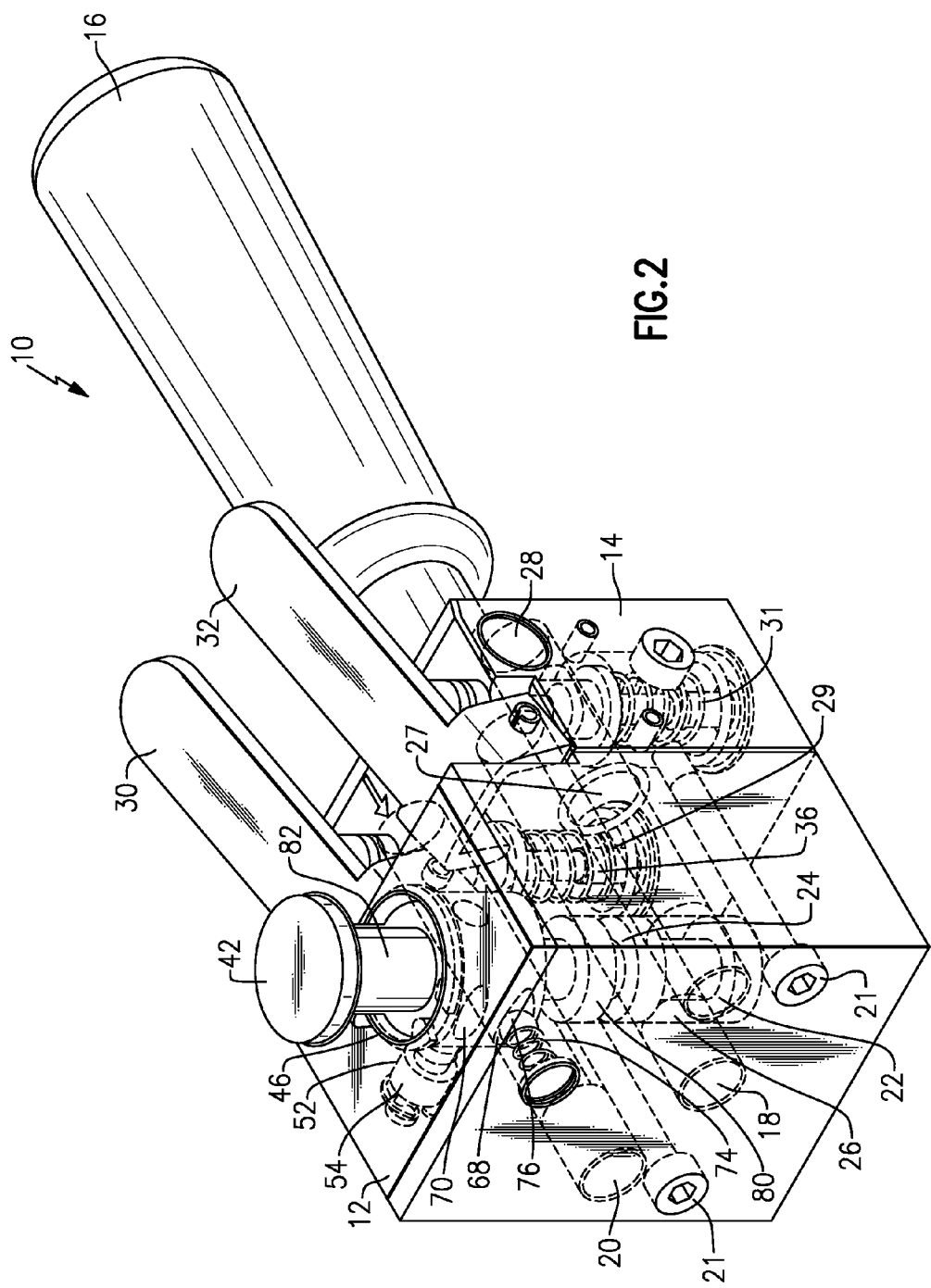
FIG. 2 illustrates another perspective view of the handheld device showing the internal components.
Figure 3:
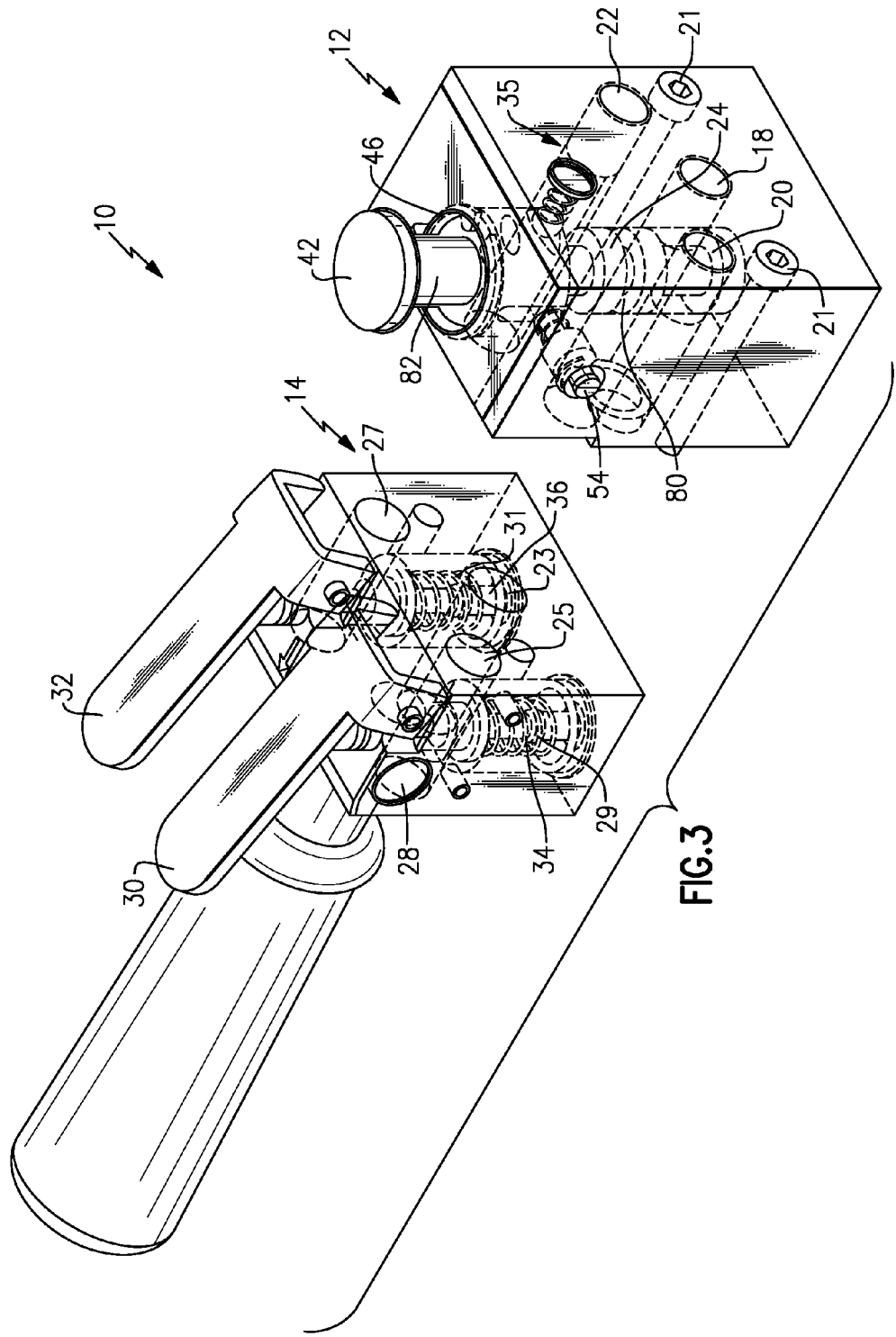
FIG. 3 illustrates an exploded perspective view of the handheld device.
Figure 4:
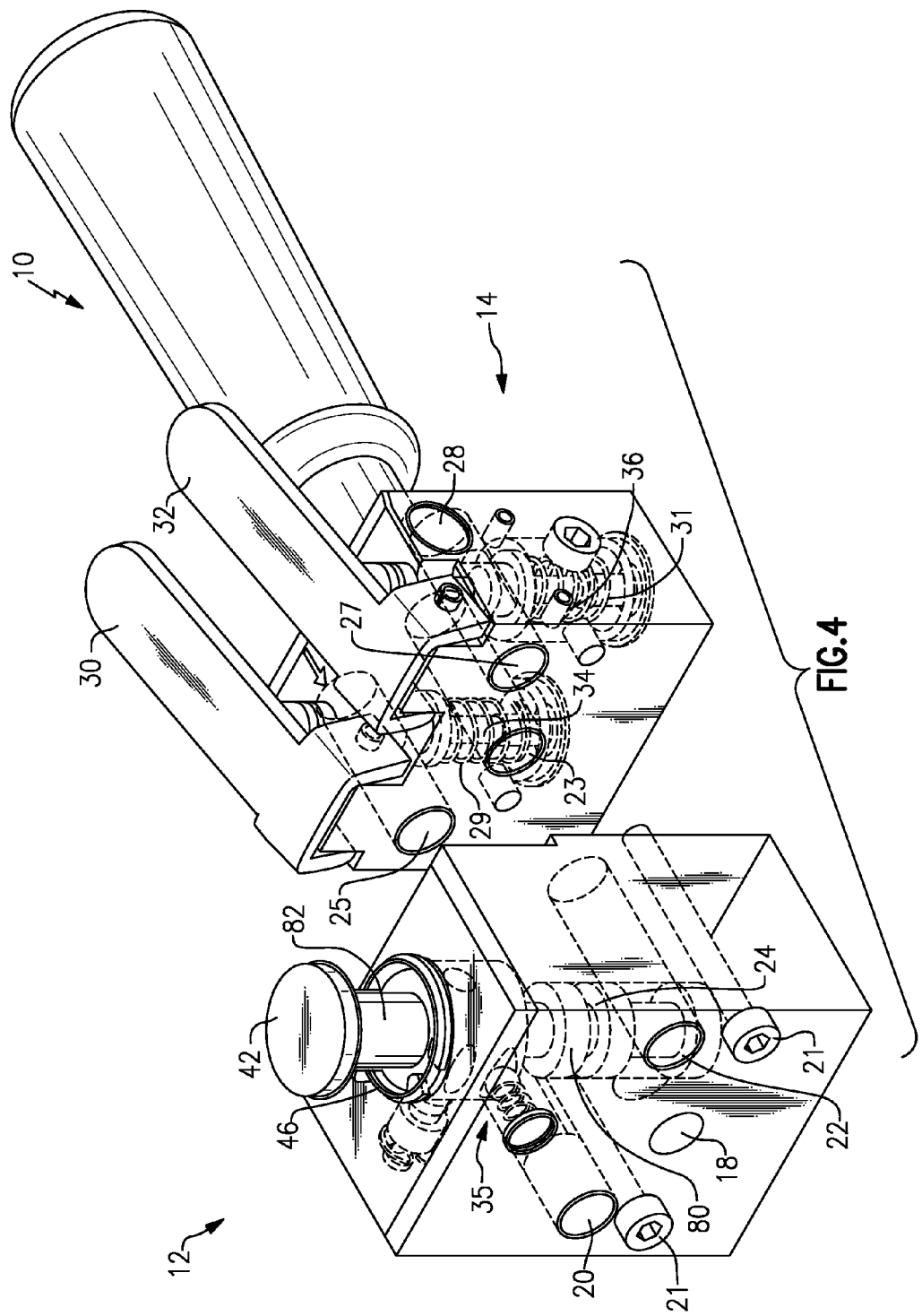
FIG. 4 illustrates another exploded perspective view of the handheld device.

During normal operation of the emergency stop valve 12, air pressure enters through the inlet 18 of the emergency stop valve 12 and the inlet 23 of the pendant valve 14. In FIGS. 1 and 2, the first pendant 30 and the second pendant 32 are not pressed or activated, and the first valve stem 34 and the second valve stem 36, respectively, prevent the flow of the air through the first outlet 25 and the second outlet 27, respectively, and to first outlet 20 and the second outlet 22, respectively. The outlet air then flows through the exhaust 28 of the pendant valve 14.

During normal operation, if either the first pendant 30 or the second pendant 32 are pressed by an operator, the first valve stem 34 or the second valve stem 36, respectively, move downwardly, allowing the passage of air through the first outlet 25 or the second outlet 27, respectively, and the first outlet 20 or the second outlet 22, respectively. When the first pendant 30 is pressed and the air is directed through the first outlet 25 and the first outlet 20, a workpiece connected to the first outlet 20 is activated. When the second pendant 32 is pressed and the air is directed through the second outlet 27 and the second outlet 22, a workpiece connected to the second outlet 22 is activated.

When the pressure is released from the first pendant 30 and the second pendant 32 by the operator, a first resilient member 29 and second resilient member 31, respectively, bias the first pendant 30 and the second pendant 32, respectively, upwardly and back to the original position shown in FIGS. 1 and 2. Pressure from the outlets 25 and 27 flows through the exhaust 28 of the pendant valve 14.

The valve stem assembly 24 includes a stem portion 80 and an emergency stop button portion 82 including an upper surface 42. A retaining ring 46 surrounds the emergency stop button portion 82 of the valve stem assembly 24 to retain the emergency stop button portion 82 of the valve stem assembly 24 in the emergency stop valve 12. A plurality of seals 50, such as o-rings, surround the valve stem assembly 24 to provide sealing between the valve stem assembly 24 and a passage 26 of the emergency stop valve 12 that receives valve stem assembly 24. A non-stick ring 41, such as Teflon®, forms a ring that surrounds an outer surface of the seals 50. Teflon® is a registered trademark of E.I. Du Pont of Wilmington, Del. Although the valve stem assembly 24 including a separate stem portion 80 and an emergency stop button portion 82 are illustrated and described, the features can be integrated into a single monolithic component.

Figure 5:
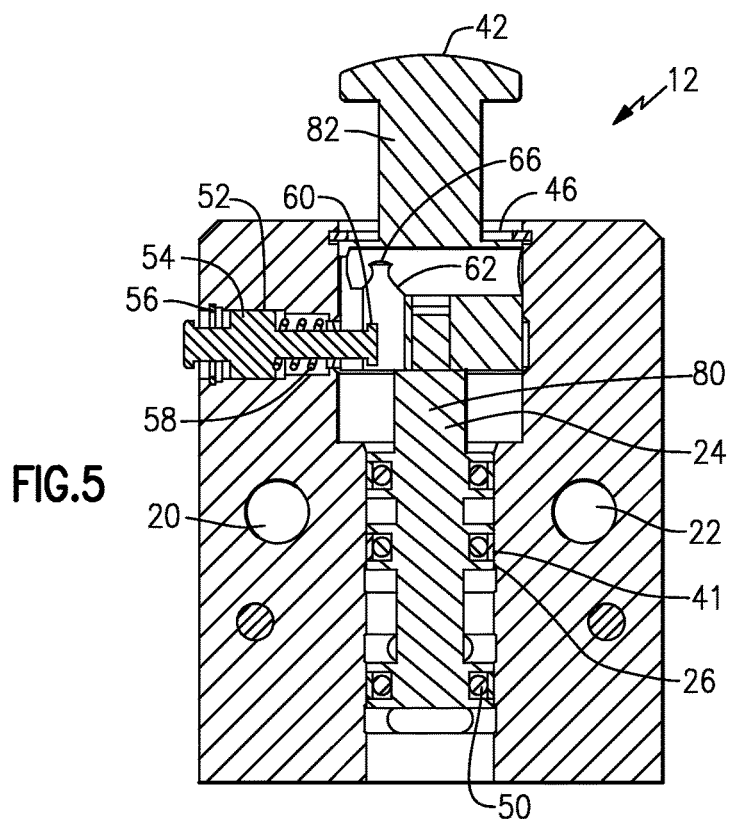
FIG. 5 illustrates a front view of the handheld device when in a standard operating position.
Figure 6:
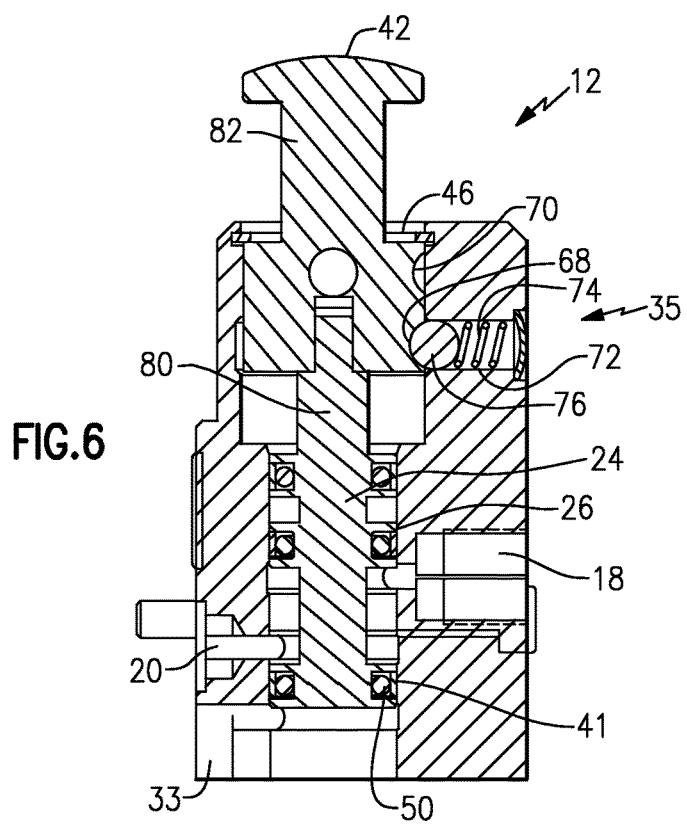
FIG. 6 illustrates a side view of the handheld device when in the standard operating position.

FIGS. 5 and 6 show the emergency stop valve 12 during normal operation and when the upper surface 42 of the emergency stop button portion 82 has not been pressed. The valve stem assembly 24 does not block the flow of air, and the air flows to the pendant valve 14.

Figure 7:
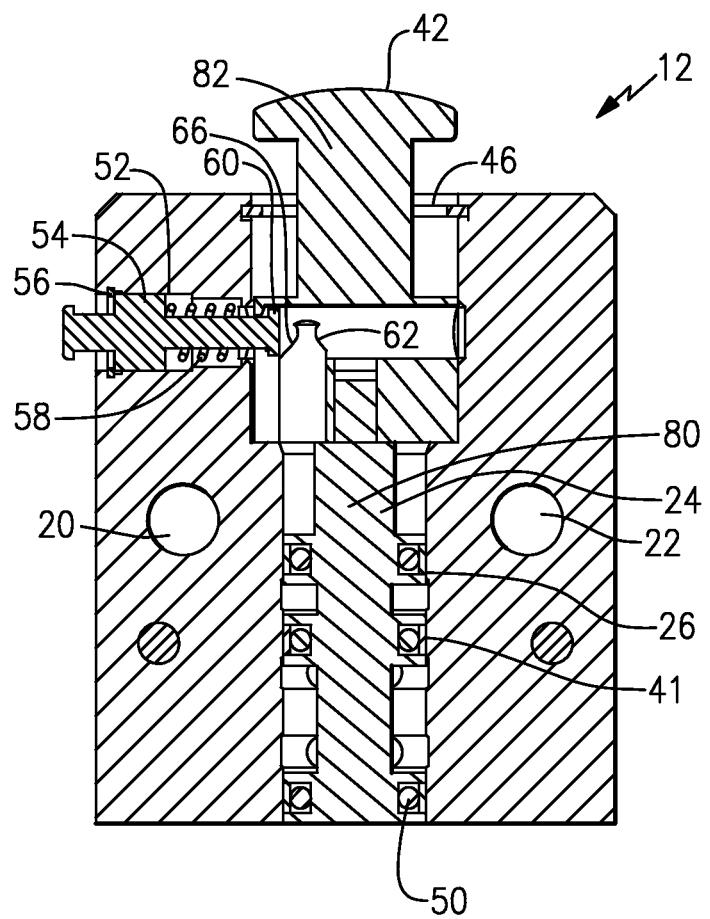
FIG. 7 illustrates a front view of the handheld device when an emergency stop button is activated and in an emergency stop position.

As shown in FIG. 7, when the upper surface 42 of the emergency stop button portion 82 is pressed or actuated, the air through the inlet 18 is blocked to prevent the flow of air to the inlet 23 of the pendant valve 14, and any air in the system is diverted to the exhaust 33 of the emergency stop valve 12. The valve stem assembly 24 moves from a first position (FIG. 5) to a second position (FIG. 7) to prevent the flow of air through the inlet 23 of the pendant valve 14. The valve stem assembly 24 closes the supply of air and draws any downstream pressure in the system to the exhaust 33 of the emergency stop valve 12.

The emergency stop valve 12 includes another passage 52 that receives a valve lock 54 that helps to retain the valve stem assembly 24 in the second position after the upper surface 42 of the emergency stop button portion 82 is pressed. A compression resilient member 58, such as a spring, biases the valve lock 54 away from the valve stem assembly 24. The valve lock 54 includes an annular projection 60 that is received in a cavity 62 in the valve stem assembly 24. The cavity 62 includes a pocket 66. A retaining ring 56 secures the valve lock 54 in position in the emergency stop valve 12 and therefore helps to retain the valve stem assembly 24 in the second position.

As shown in FIG. 5, during normal operation of the handheld device 10, the annular projection 60 of the valve lock 54 is located in the cavity 62 in the valve stem assembly 24. Air flows into the inlets 18 and 23 and through either the first outlet 20 or the second outlet 22, respectively, and either the first outlet 25 or the second outlet 27, respectively, depending on the activation of either the first pendant 30 or the second pendant 32, respectively. If neither the first pendant 30 nor the second pendant 32 are activated or pressed, the outlet air flows out through the exhaust 28 of the pendant valve 14.

When the upper surface 42 of the emergency stop button portion 82 is pressed, the valve stem assembly 24 moves downwardly in the passage 26 to the second position shown in FIG. 7, preventing supply air from flowing into the inlet 23 of the pendant valve 14 and redirecting air from the inlet 23 of the pendant valve 14 to the exhaust 33 of the emergency stop valve 12. The annular projection 60 of the valve lock 54 slides along the surface of the cavity 62 and is received in the pocket 66 of the cavity 62, retaining the valve stem assembly 24 in the second position and allowing any pressurized air in the outlets 20 and 22 of the emergency stop valve 12 to flow through the exhaust 33 of the emergency stop valve 12, and not into the pendant valve 14, in an emergency situation.

After the emergency situation is over, the valve lock 54 is pressed inwardly against the bias of the compression resilient member 58, removing the annular projection 60 of the valve lock 54 from the pocket 66 of the cavity 62, allowing the valve stem assembly 24 to move upwardly to the first position when the emergency stop button portion 82 is pulled upwardly. The valve stem assembly 24 returns to the first position, allowing the air to flow through the inlets 18 and 23 and through the first outlet 20 and the second outlet 22 of the pendant valve 14 only when the pendants 30 and 32, respectively, are pressed for normal operation. If the pendants 30 and 32 are not pressed, the air flows through the outlets 20, 22, 25, and 27 to the exhaust 28 of the pendant valve 14.

The valve stem assembly 24 also includes a first recess 68 and a second recess 70 of a detent mechanism 35. The detent mechanism 35 assists in locking the valve stem assembly 24 in position. The emergency stop valve 12 includes a passage 72 that receives a resilient member 74 that biases a spherical stop 76 towards the valve stem assembly 24. In one example, the resilient member 74 is a spring. When the valve stem assembly 24 is in the first position, the resilient member 74 biases the spherical stop 76 into the first recess 68 of the valve stem assembly 24 and acts as the detent mechanism 35 to help retain the valve stem assembly 24 in the first position. When the upper surface 42 of the emergency stop button portion 82 is pressed, the spherical stop 76 moves along the valve stem assembly 24 until it is received in the second recess 70 of the valve stem assembly 24 when in the second position. The resilient member 74 biases the spherical stop 76 into the second recess 70 of the valve stem assembly 24 to help retain the valve stem assembly 24 in the second position.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A handheld device comprising:
an emergency stop valve including an inlet, an outlet, an exhaust, a main passage, and a stem passage, wherein air flows from the inlet to the outlet and from the outlet to the exhaust during normal operation of the handheld device, and the inlet is blocked and the air is exhausted through the exhaust during emergency operation of the handheld device;
a valve stem assembly received in the main passage, wherein the valve stem assembly includes a button and a cavity having a pocket; and
a locking stem including an end portion, wherein the locking stem is received in the stem passage, and the end portion of the locking stem is received in the cavity of the valve stem assembly, the end portion of the locking stem is located in the cavity during normal operation of the handheld device when the valve stem assembly is in a first position to direct the air to the inlet of a pendant valve, and the end portion of the locking stem is located in the pocket of the cavity of the valve stem assembly during emergency operation of the handheld device to retain the valve stem assembly in a second position when the emergency button is activated to direct the air to the exhaust.

2. The handheld device as recited in claim 1, wherein the pendant valve is directly attached to the emergency stop valve.

3. The handheld device as recited in claim 2, wherein the outlet of the emergency stop valve comprises a first outlet and a second outlet, the pendant valve includes an inlet, a first outlet, a second outlet, an exhaust, a first pendant and a second pendant, the air flows through the exhaust of the pendant valve during normal operation, the air flows through the first outlet of the pendant valve when the first pendent is pressed, and the air flows through the second outlet of the pendant valve when the second pendent is pressed.

4. The handheld device as recited in claim 3, wherein the pendant valve includes a first valve stem and a second valve stem, the pendant valve includes a first passage in which the first valve stem is received and a second passage in which the second valve stem is received, and the first pendent is pressed to move the first valve stem downwardly in the first passage to allow air to flow through the first outlet of the pendant valve and the second pendent is pressed to move the second valve stem downwardly in the second passage to allow air to flow through the second outlet of the pendant valve.

5. The handheld device as recited in claim 4, wherein a first resilient member biases the first valve stem upwardly and a second resilient member biases the second valve stem upwardly.

6. The handheld device as recited in claim 1, including a seal between the valve stem and the passage in the emergency stop valve.

7. The handheld device as recited in claim 6, wherein a non-stick ring surrounds each seal.

8. The handheld device as recited in claim 1, wherein a resilient member biases the locking stem away from the valve stem assembly of the emergency stop valve.

9. The handheld device as recited in claim 8, wherein the locking stem is pressed inwardly towards the valve stem assembly against the bias of the resilient member to move the end portion of the locking stem into the pocket and allow the valve stem assembly to move upwardly from the second position to the first position.

10. The handheld device as recited in claim 1, including a detent mechanism to aid in retaining the valve stem assembly in one of the first position and the second position.

11. The handheld device as recited in claim 10, wherein the valve stem assembly includes a first groove and a second groove, and the detent mechanism includes a resilient member that biases a stop member towards the valve stem assembly and into one of the first groove and the second groove.

12. The handheld device as recited in claim 11, wherein the stop member is a spherical stop.

13. The handheld device as recited in claim 11, wherein the stop member is biased into the first groove when the valve stem assembly is in the first position to help retain the valve stem assembly in the first position, and movement of the valve stem assembly from the first position to the second position causes the stop to remove from the first groove and enter the second groove of the valve stem assembly to help retain the valve stem assembly in the second position.

14. A handheld device comprising:
an emergency stop valve including a housing having a main passage and a stem passage;
a valve stem assembly received in the main passage, wherein the valve stem assembly includes a button and a cavity having a pocket; and
a locking stem including an end portion, wherein the locking stem is received in the stem passage, and the end portion of the locking stem is received in the cavity of the valve stem assembly, the end portion of the locking stem is located in the cavity during normal operation of the handheld device when the valve stem assembly is in a first position to direct the air to a pendant valve, and the end portion of the locking stem is located in the pocket of the cavity of the valve stem assembly during emergency operation of the handheld device to retain the valve stem assembly in a second position when the emergency button is activated to direct the air to an exhaust.

15. The handheld device as recited in claim 14, wherein a resilient member biases the locking stem away from the valve stem assembly of the emergency stop valve.

16. The handheld device as recited in claim 15, wherein the locking stem is pressed inwardly towards the valve stem assembly against the bias of the resilient member to move the end portion of the locking stem into the pocket and allow the valve stem assembly to move upwardly from the second position to the first position.

17. The handheld device as recited in claim 14, including a detent mechanism to aid in retaining the valve stem assembly in one of the first position and the second position.

18. The handheld device as recited in claim 17, wherein the valve stem assembly includes a first groove and a second groove, and the detent mechanism includes a resilient member that biases a stop member towards the valve stem assembly and into one of the first groove and the second groove.

19. The handheld device as recited in claim 18, wherein the stop member is a spherical stop.

20. The handheld device as recited in claim 18, wherein the stop member is biased into the first groove when the valve stem assembly is in the first position to help retain the valve stem assembly in the first position, and movement of the valve stem assembly from the first position to the second position causes the stop to remove from the first groove and enter the second groove of the valve stem assembly to help retain the valve stem assembly in the second position.

\* \* \* \* \*

UNITED STATES PATENT AND TRADEMARK OFFICE
CERTIFICATE OF CORRECTION

| | | |
|---|---|---|
| PATENT NO. | : 9,618,133 B2 | Page 1 of 1 |
| APPLICATION NO. | : 14/620280 | |
| DATED | : April 11, 2017 | |
| INVENTOR(S) | : Dennis L. Mortenson | |

It is certified that error appears in the above-identified patent and that said Letters Patent is hereby corrected as shown below:

In the Claims

Claim 1, Column 4, Line 52; before "button is activated" delete "emergency"

Claim 3, Column 4, Line 63; after "when the first" replace "pendent" with --pendant--

Claim 3, Column 4, Line 65; after "when the second" replace "pendent" with --pendant--

Claim 4, Column 5, Line 3; after "and the first" replace "pendent" with --pendant--

Claim 4, Column 5, Line 6; after "and the second" replace "pendent" with --pendant--

Claim 6, Column 5, Line 15; after "valve stem and" replace "the passage" with --the main passage--

Claim 13, Column 5, Line 44; after "position causes" replace "the stop" with --the stop member--

Claim 14, Column 6, Line 13; after "to direct" replace "the air" with --air--

Claim 14, Column 6, Line 18; before "button is activated" delete "emergency"

Claim 20, Column 6, Line 45; after "position causes" replace "the stop" with --the stop member--

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*